J. S. SHNELL.
Detaching Horses.
No. 3,536. Patented Apr. 13, 1844.
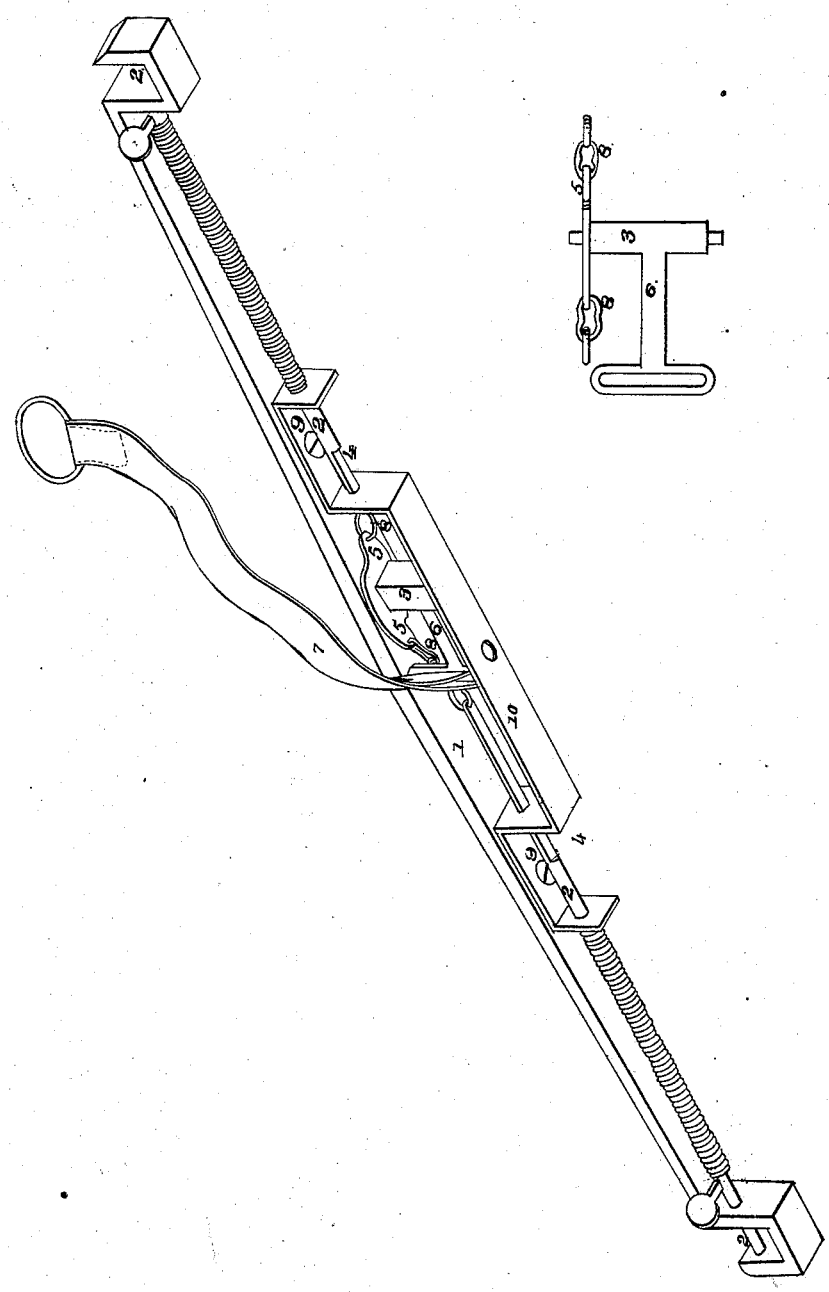

UNITED STATES PATENT OFFICE.

JAMES S. SHNELL, OF SHIREMANSTOWN, PENNSYLVANIA.

DISENGAGING HORSES FROM CARRIAGES.

Specification of Letters Patent No. 3,536, dated April 13, 1844.

*To all whom it may concern:*

Be it known that I, JAMES S. SHNELL, of Shiremanstown, in the county of Cumberland and State of Pennsylvania, have invented a new and useful Improvement in Whiffletrees for Disengaging Horses Therefrom; and I do hereby declare that the following is a full, clear, and exact description thereof, reference being had to the accompanying drawing.

The nature of my invention consists in connecting the spring bolts in construction similar to those now in use, with arms attached to an upright revolving shaft, by turning which the bolts are drawn back.

The construction is as follows: A flat bar of iron 1, slightly tapered from the center toward each end, where it is bent downward at right angles and thence outward parallel with the other part of the bar, and the extreme ends are bent upward vertically nearly to the height of the straight part of the bar, thus forming a recess into which the trace is put. Under the center of the whiffle-tree, a long flat loop (10) is put, the ends being formed like those of the whiffle-tree but it is in a reverse position, and about one-third the length of the bar above, the part that touches said bar having bolts or screws (9) through it by which it is connected with the bar.

A hole is made through the vertical parts of the loop (10) just under the bar, and on a horizontal line therewith holes are made in the bent ends of the bar. In these holes the spring bolts (2) are fastened so as to slide back and forth in the usual way, being forced outward by spiral springs; on these bolts there is a stop or shoulder (4) to prevent their receding too far when drawn back. The drawing back is effected in the following way: Near the center of the bar there is an upright shaft (3) having a horizontal arm (5) extend out from it each way toward the bolts (2) to which they are connected by a chain rod or strap (8) the shaft has its bearings in the loop (10) and bar and is made to revolve by an arm (6) projecting from it, to which a strap (7) is connected that extends up to the driver's hand; by pulling the strap (7) the shaft (3) is turned and the bolts are drawn back, thus releasing the traces from the spring bolts, and allowing them to be drawn out.

What I claim as my invention and desire to secure by Letters Patent is—

The combination of the shaft (3,) and arms 5, 5, and 6, with the spring bolts constructed and arranged substantially in the manner and for the purpose herein set forth.

JAMES S. SHNELL.

Witnesses:
J. J. GREENOUGH,
L. CALDWELL.